(12) United States Patent
Thomson et al.

(10) Patent No.: US 8,045,532 B2
(45) Date of Patent: Oct. 25, 2011

(54) LOCATION ARCHITECTURE FOR LARGE SCALE NETWORKS

(75) Inventors: Allan Thomson, Pleasanton, CA (US); David S. Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 651 days.

(21) Appl. No.: 11/558,407

(22) Filed: Nov. 9, 2006

(65) Prior Publication Data

US 2008/0112372 A1      May 15, 2008

(51) Int. Cl.
*H04W 4/00*       (2009.01)

(52) U.S. Cl. .................. 370/338; 455/456.1; 455/432.1; 455/436; 455/438; 455/439; 455/440; 455/445; 455/448

(58) Field of Classification Search ............... 455/456.1, 455/436, 438, 439, 440, 445, 448; 370/338
See application file for complete search history.

(56) References Cited

U.S. PATENT DOCUMENTS

| | | | | |
|---|---|---|---|---|
| 5,815,810 | A * | 9/1998 | Gallant et al. | 455/433 |
| 6,078,582 | A * | 6/2000 | Curry et al. | 370/356 |
| 6,085,188 | A | 7/2000 | Bachmann et al. | |
| 6,292,478 | B1 * | 9/2001 | Farris | 370/352 |
| 6,347,312 | B1 | 2/2002 | Byrne et al. | |
| 6,501,746 | B1 | 12/2002 | Leung | |
| 6,785,536 | B1 | 8/2004 | Lee et al. | |
| 7,164,922 | B2 * | 1/2007 | McCann | 455/456.1 |
| 2002/0160815 | A1 * | 10/2002 | Patel et al. | 455/564 |
| 2004/0014473 | A1 * | 1/2004 | Ando et al. | 455/432.1 |
| 2006/0198351 | A1 * | 9/2006 | Baek | 370/338 |
| 2007/0014282 | A1 * | 1/2007 | Mitchell | 370/352 |
| 2007/0149243 | A1 * | 6/2007 | Hwang et al. | 455/551 |

OTHER PUBLICATIONS

Notification of Transmittal of the International Search Report and the Written Opinion of the International Searching Authority, or the Declaration, PCT Application No. PCT/US07/83481, filed Nov. 2, 2007.

* cited by examiner

*Primary Examiner* — Kamran Afshar
*Assistant Examiner* — Edward Zhang
(74) *Attorney, Agent, or Firm* — Baker Botts L.L.P.

(57) ABSTRACT

In one embodiment, a method includes receive a connection event message including information identifying a wireless node, wherein the identifying information comprises a wireless node identifier and an area code associated with the wireless node; determine, based on the area code, whether the wireless node is connected to its home wireless network region; add the identifying information to a location services table; and if the wireless node is not connected to its home network region, transmit a remote connection event message to a home area code authority server corresponding to the wireless node.

27 Claims, 9 Drawing Sheets

Fig. 8 ns and productivity of their communications and applications, and in doing so, require greater visibility, security, management, and performance from their network. As WLANs deployments, as well as wired networks, grow in scale, the products that provide location services on top of those networks need to also scale.

LOCATION ARCHITECTURE FOR LARGE SCALE NETWORKS

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. As WLANs deployments, as well as wired networks, grow in scale, the products that provide location services on top of those networks need to also scale.

DESCRIPTION OF EXAMPLE EMBODIMENTS

A. Overview

Particular embodiments of the present invention provide a scalable location system for wired and wireless networks. According to one implementation of the present invention, when a wireless node connects to the wireless network, an area code authority server (ACAS) receives a connection event message, which includes identifying information such as a media access control (MAC) address of the wireless node and an area code of the wireless node. ACASs are described in more detail below. Other identifying information may also include hardware serial number, Internet protocol (IP) address, and one or more certificates (e.g., X.509 certificates). In one embodiment, identifying information may also include device identity and user identity, which is useful where a single user has several wireless devices/nodes on the network simultaneously. The ACAS stores the identifying information in a location services table, which may reside on an appropriate wireless network infrastructure node such as on the ACAS, on a location server, on a central controller, etc. In one implementation, a home ACAS of a given wireless node is the ACAS that services the area code associated with and that follows the wireless node regardless of where the wireless node connects to the wireless network. A given ACAS may support one or more home area codes. A local ACAS is the ACAS that services the area code in which the wireless network node is currently connected, which may or may not be the home ACAS. If the local ACAS may also be referred to as a remote ACAS if it is not the home ACAS. If the ACAS is a remote ACAS (i.e., not the home ACAS), the ACAS forwards the connection event message to the home ACAS so that the home ACAS knows where the wireless node is located. In one implementation, if a given ACAS receives a location query for a wireless node, the ACAS determines if it is the home ACAS for the wireless node. If not, the ACAS forwards the location query to the home ACAS. If the ACAS is the home ACAS for the wireless node, the ACAS retrieves the location from the location services table or alternatively queries a location server for the location. The process flows described herein are essentially the same for wired (e.g., 802.3) clients.

B. Example Wireless Network System Architecture

B.1. Network Topology

Figure 1:
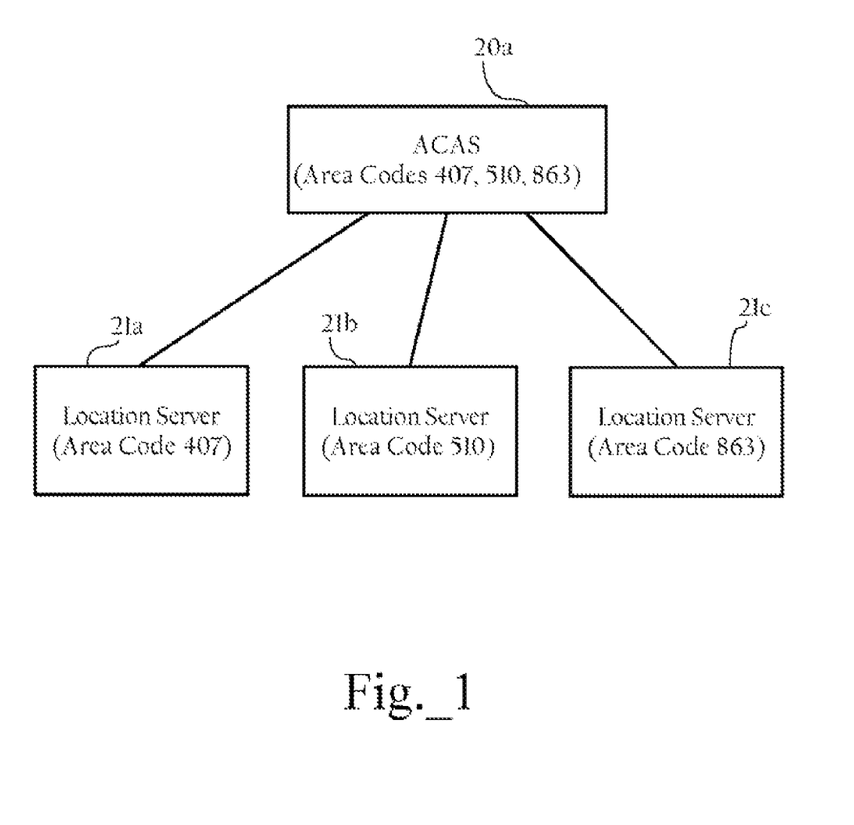
FIG. 1 illustrates an example logical representation of a wireless network environment implemented by an area code authority server (ACAS) and multiple location servers.

FIG. 1 illustrates an example logical representation of a wireless network environment implemented by an ACAS 20 and location servers 21a, 21b, and 21c. In one implementation, each ACAS manages/controls one or more physical regions identified by area codes (e.g., area codes 407, 510, and 863). Such physical regions may be segments or portions of the wireless network referred to as area code authority regions (ACARs). Each ACAR may have a primary ACAS, which has the set of area codes for which it is responsible and maps each of those area codes to a primary location sever (e.g., one primary server for one or more area codes). Within an ACAR, an ACAS manages one or more location servers 21a, 21b, and 21c, which may be associated with respective area codes (e.g., area codes 407, 510, and 863). In one implementation, one location server 21 may also be associated with more than one area code. In one implementation, the ACAS as well as the location server may be deployed redundantly and have primary/secondary backups. A single location server set, which includes a primary location server and backup location servers, may manage multiple area codes if necessary. As described in more detail below, each location server 21 tracks the location of wireless nodes in the portion of the network associated with the location server 21.

In one implementation, each ACAS may be identified by its Internet Protocol (IP) Address. The protocol used to communicate with the ACAS may be defined over Transmission Control Protocol (TCP) or User Datagram Protocol (UDP) and may be secured using Transport Layer Security (TLS) in order to secure communications across all location infrastructure elements. To enable easier deployment and configuration. Domain Name System (DNS) may be used to define location domains for each ACAR and each ACAS may be found by a DNS lookup.

Figure 2:
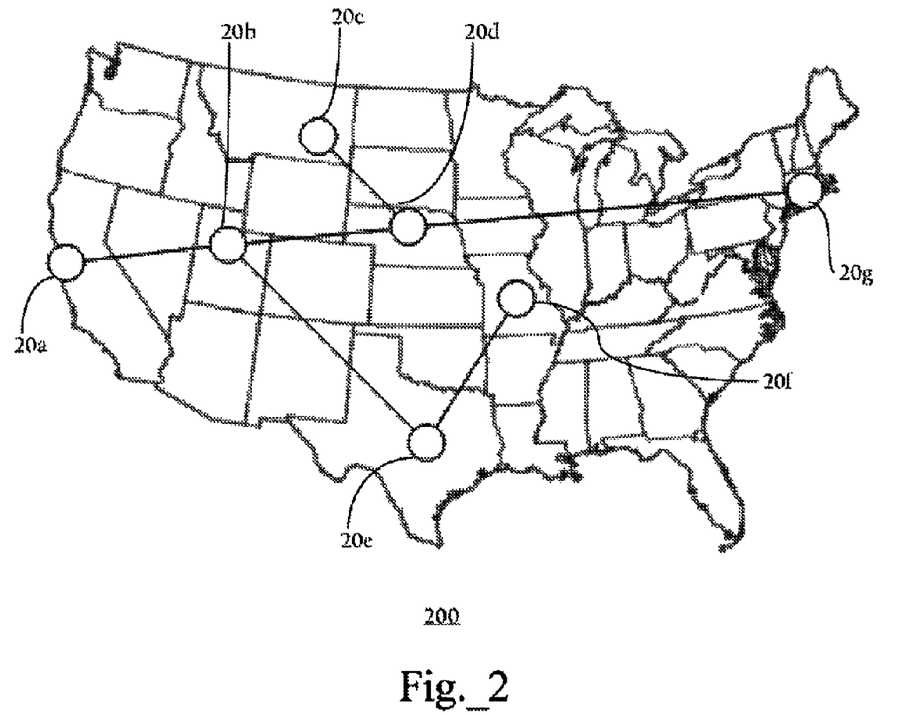
FIG. 2 illustrates an example physical deployment of the wireless network of FIG. 1.

FIG. 2 illustrates an example physical deployment of the wireless network of FIG. 1. As FIG. 2 illustrates, multiple ACASs 20a, 20b, 20c, 20d, 20e, 20f, and 20g may be physically deployed across a large-scale wireless network (e.g., across a country) and assigned to one or more respective ACARs. In one implementation, the entire wireless network domain may be divided into ACARs. As indicated above in connection with FIG. 1, each ACAR may have a primary ACAS that services a set of area codes and has a definition of how those area codes map to a primary location server for each area code. In one implementation, an area code may be domain-wide or may associate a location server to a region within the entire network domain. In one implementation, an area code may be defined in public and/or private domains (e.g., public Internet and/or private corporate intranet). In one implementation, to enable easier deployment and configuration, a Domain Name System (DNS) could be used to define location domains for each ACAR (e.g., east-coast ACAR, west-coast ACAR) and each ACAS may be found by a DNA lookup.

Figure 3A:
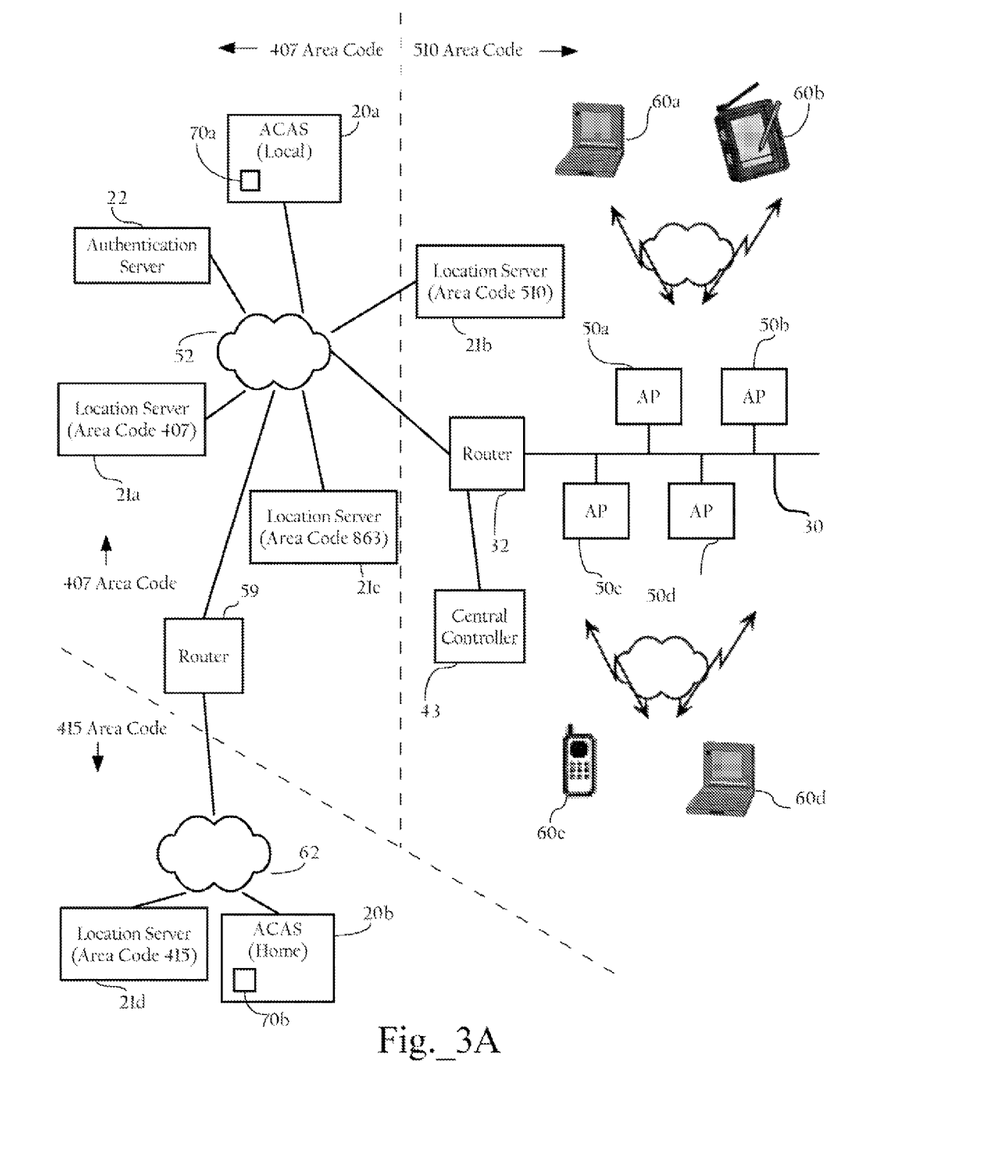
FIG. 3A illustrates example components in a wireless local area network (WLAN) system.

FIG. 3A illustrates example components in a wireless local area network (WLAN) system. In a specific implementation, the system includes one or more ACASs 20*a* and 20*b*. ACAS 20*a* is operatively coupled to an Authentication Authorization and Account (AAA) server 22, a central controller 43 via a router 32, and a local area network (LAN) 30, which couples to wireless access points 50*a*, 50*b*, 50*c*, and 50*d*. LAN 30 is implemented by a switch (or an array of switches) and/or other network devices, such as a bridge. In one implementation, ACAS 20*b* may be operatively coupled to wireless network nodes similar to those of ACAS 20*a*. For example, as FIG. 3A shows, ACAS 20*b* is operatively coupled to network 52 via a router 59, a network 62, and a location server 21*d*.

As described above, an ACAS may be associated with one or more location servers. For example, ACAS 20*a* is associated with location servers 21*a*, 21*b*, and 21*c*, which are assigned to respective area codes 407, 510, and 863. Similarly, ACAS 20*b* is associated with location server 21*d*, which is assigned to area code 415. As FIG. 3A illustrates, location server 21*b* is associated with router 32 and wireless access points 50 in order to service a given area code 510. Accordingly, the location server 21*b* is configurable to determine the location of wireless nodes 60 that connect to the wireless network via wireless access points 50. As described in more detail below, ACASs 20*a* and 20*b* include location services tables 70*a* and 70*b*, respectively. As described in more detail below, location services tables store identifying information of wireless nodes, where the identifying information may include, for example, the media access control (MAC) address of a wireless node, the area code of the wireless node, and/or the location of the wireless node. In one implementation, the location services tables 70*a* and 70*b* may reside in the ACASs 20 and 20*b*. However, the location services tables 70*a* and 70*b* may reside in any appropriate wireless network node such as a location server, central controller, etc.

In one implementation, the area code, or home area code, of a wireless node is associated with a home ACAS and follows the wireless node regardless of where the wireless node connects to the wireless network. In one implementation, each individual network endpoint or user of the wireless network may have an assigned area code. As described in more detail below in connection with FIG. 7, an area code of a given wireless node may be provided in a number of ways. For example, the area code may be preprogrammed on the wireless node directly, preprogrammed as part of the MAC chipset, user entered, etc. Alternatively, the area code could be downloaded to the wireless node during connection to the wireless network in order to enhance credentials downloaded from a AAA server (e.g., over RADIUS 802.1X).

As FIG. 3A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between ACASs 20*a* and 20*b* and wireless nodes via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 3A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless nodes 60*a*, 60*b*, 60*c*, and 60*d*. In one implementation, wireless nodes 60 may include notebook computers, personal digital assistants (PDAs), mobile phones, radio frequency identification (RFID) devices, etc. In one implementation, the wireless access points 50 implement the wireless network protocol specified in the IEEE 802.11 WLAN specification; of course, other wireless network protocols may be used. The wireless access points 50 may be autonomous or so-called "fat" wireless access points, or light-weight wireless access points operating in connection with a wireless switch (see FIG. 3B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

Figure 3B:
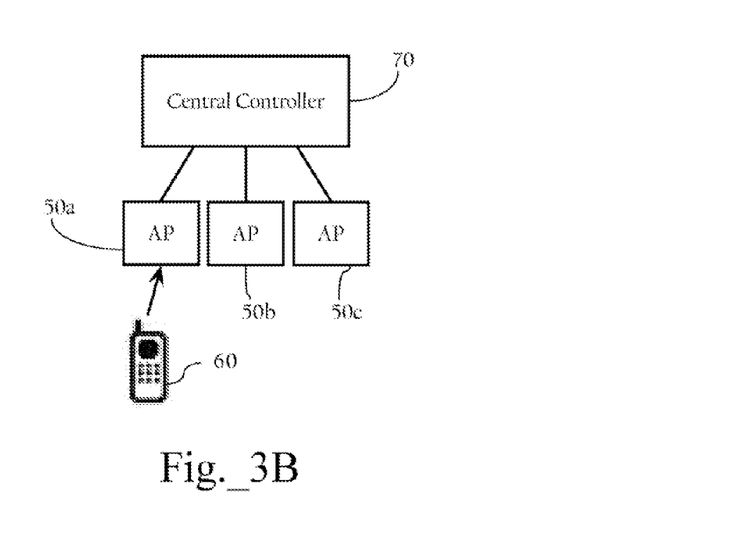
FIG. 3B illustrates an example hierarchical wireless network including a central controller.

FIG. 3B illustrates an example hierarchical wireless network including a central controller 70. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented as a wireless switch, the central controller 70 is operative to communicate with light-weight wireless access points and process wireless protocol and network management information. As FIG. 1B illustrates, a central controller 70 may be directly connected to one or more access points 50. Alternatively, a central controller 43 may be operably connected to one or more access points over a switched and/or routed network environment, as FIG. 1A illustrates.

Figure 3C:
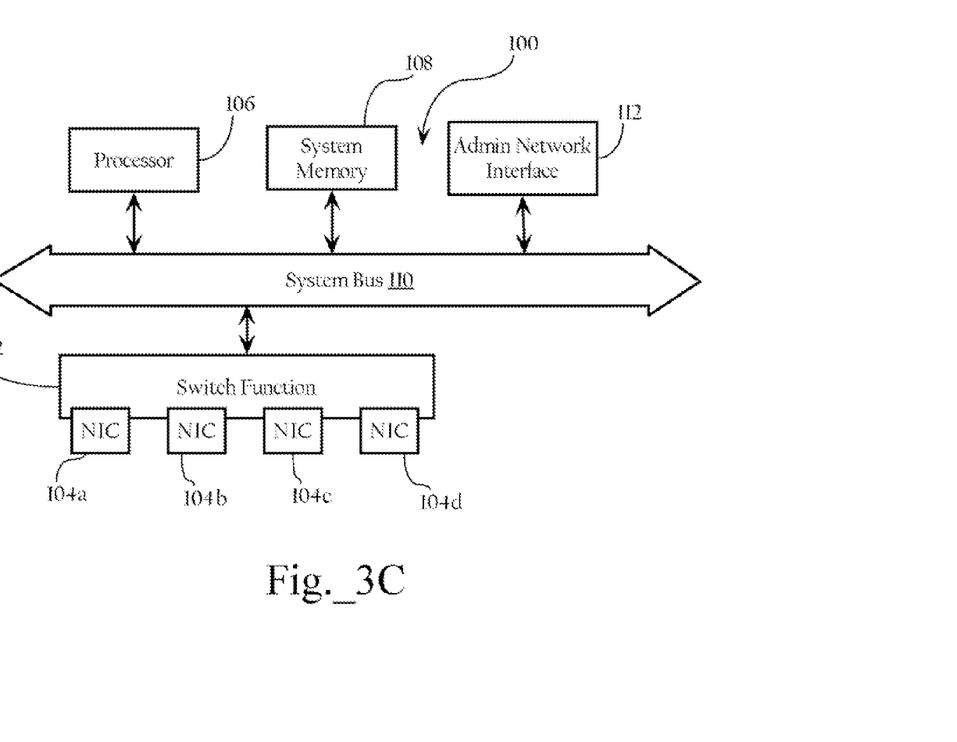
FIG. 3C illustrates an example hardware system, which may be used to implement a central controller.

FIG. 3C illustrates an example hardware system 100, which may be used to implement a central controller 70. As FIG. 3C shows, in one implementation, the central control elements each comprise a switch function or fabric 102 comprising a network interface 104*a* (e.g., an Ethernet adapter) for connection to network 52 and network interfaces 104*b*, 104*c*, and 104*d* for connection to wireless access points. This switch function or fabric is implemented to facilitate connection to the access elements. Central controller 70, in one implementation, further comprises a processor 106, a memory 108, one or more software modules stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller 70 includes a single network interface.

B.3. Area Code Authority Server

Figure 4:
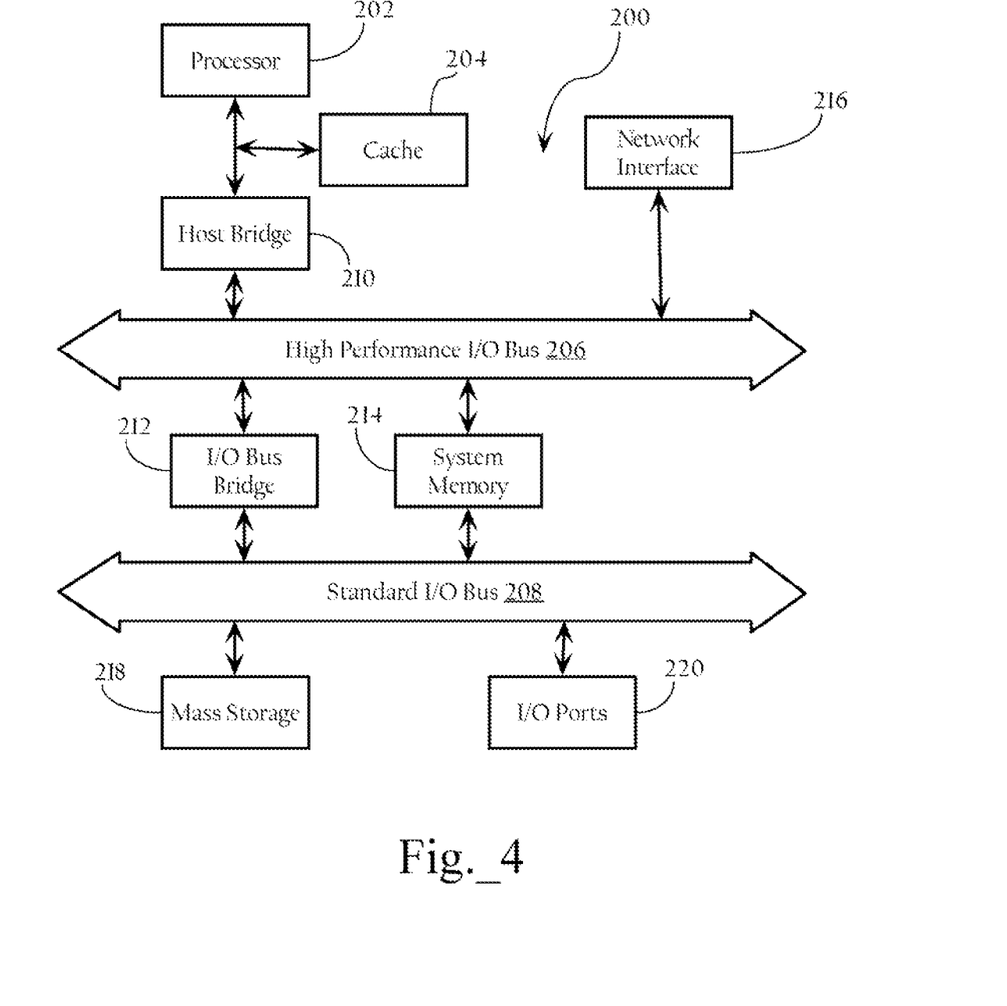
FIG. 4 illustrates an example hardware system, which may be used to implement an ACAS.

FIG. 4 illustrates an example hardware system 200, which may be used to implement an ACAS. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of an ACAS 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc., of Cupertino, Calif., UNIX operating systems, LINUS operating systems, and the like.

B.4. Wireless Access Point

Figure 5:
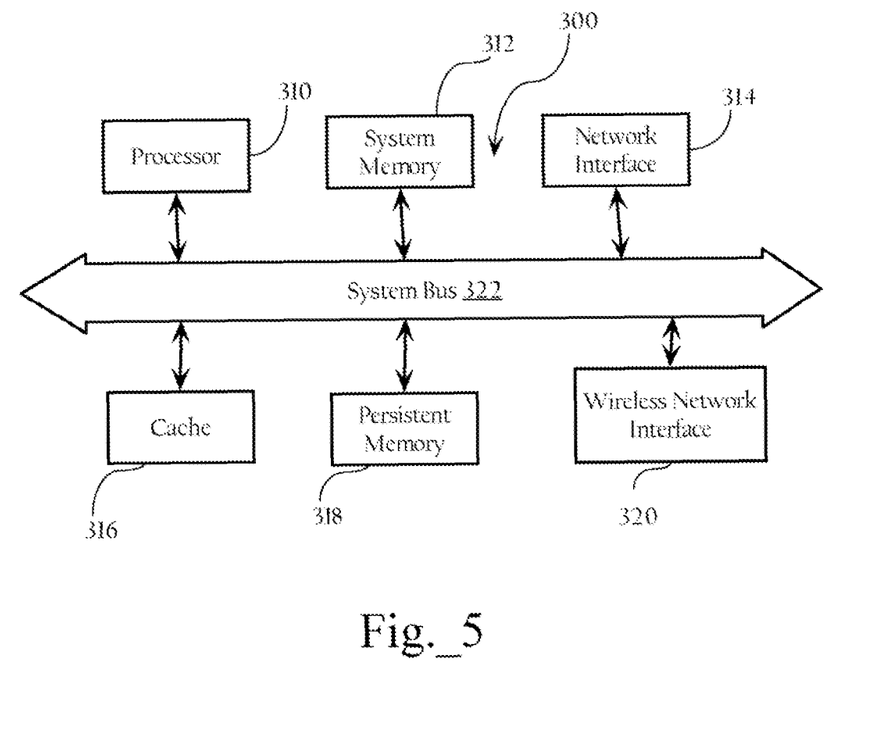
FIG. 5 illustrates an example hardware system, which may be used to implement a wireless access point.

FIG. 5 illustrates an example hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless nodes 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk driver, flash memory, EEPROM, etc.). At start up, these software components are loaded into system memory 312 and then accessed and executed by processor 310.

B.5. Wireless Node

Figure 6:
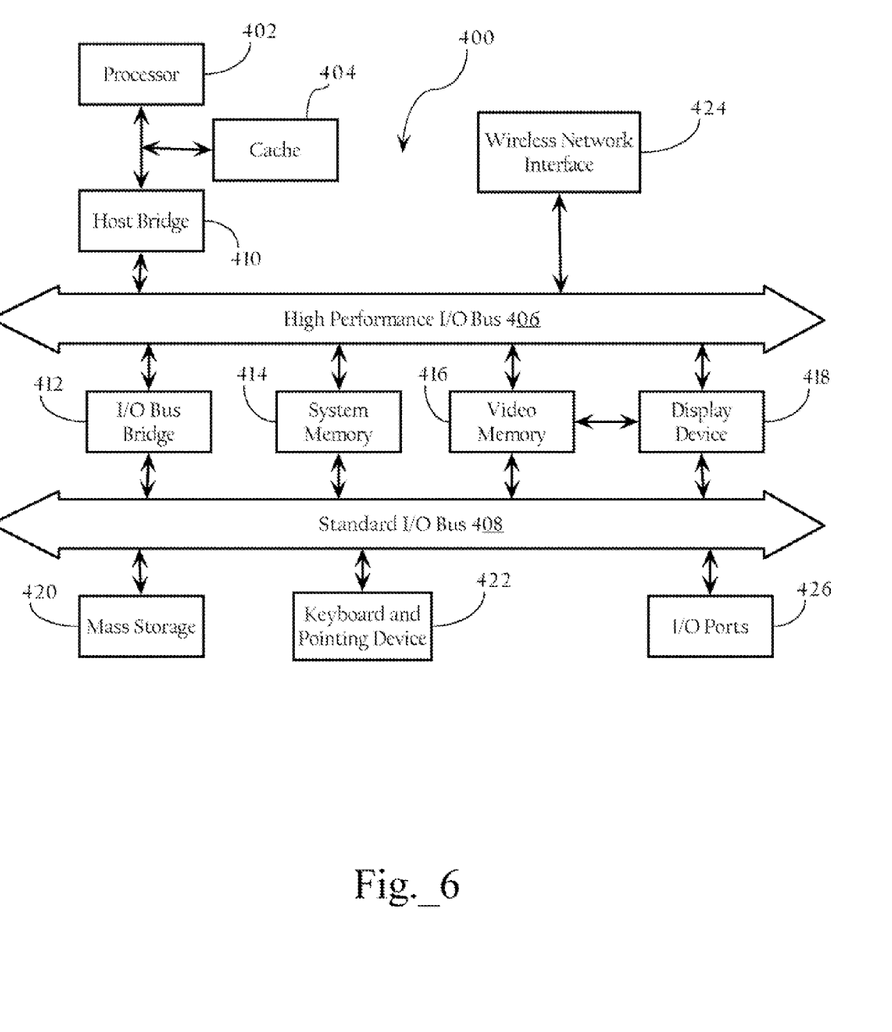
FIG. 6 illustrates an example hardware system, which may be used to implement a wireless node.

FIG. 6 illustrates an example hardware system 400, which may be used to implement a wireless node 60. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. Hardware system 400 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless node-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 6 illustrates, for didactic purposes, the hardware architecture of a wireless node according to one implementation of the present invention, the wireless node may, however, be implemented on a wide variety of computer system architectures, such as special purpose, hand held or portable devices, Personal Digital Assistants (e.g., converged devices which support WLAN data+voice). Laptop computers, hand-held phones, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Identification of a Wireless Node

As described in more detail below, a wireless node has associated identifying information, which may include, for example, a media access control (MAC) address and a home area code. The identifying information may be shared among the local ACAS (i.e., the ACAS to which a given wireless nodes is currently connected) and the home ACAS (i.e., the ACAS associated with the wireless node for administrative or resource planning purposes, regardless of where the wireless node is connected).

Figure 7:
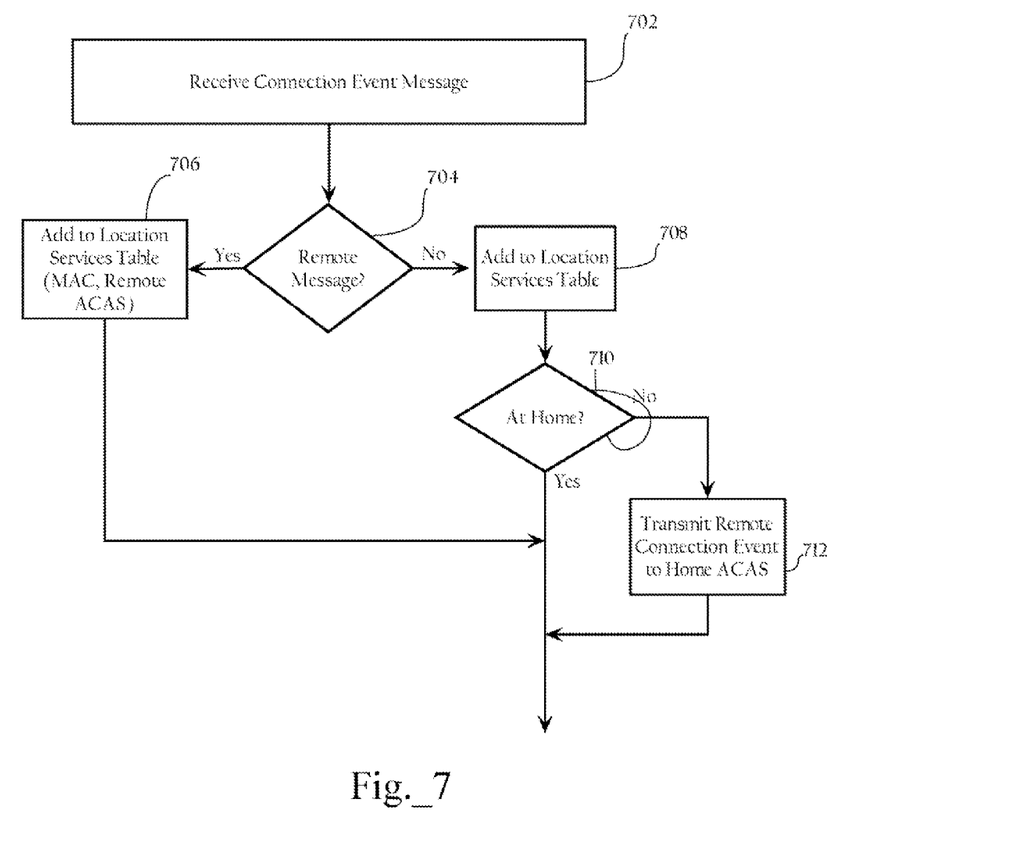
FIG. 7 illustrates an example method implemented at an ACAS.

FIG. 7 illustrates an example method implemented at an ACAS (e.g., ACAS 20a) directed to processing connection event messages. As FIG. 7 shows, ACAS 20a first receives a connection message (702). In one implementation, an appropriate wireless network node such as a wireless access point 50a (or location server 21b, central controller 43, etc.) generates the connection event message when a wireless node (e.g., wireless node 60a) successfully connects to the wireless network. In one implementation, a successful authentication and association may be considered successful connection.

In one implementation, the connection event message may include the MAC address of a given wireless node and the area code of the wireless node. In one implementation, whenever a wireless node connects to the wireless network, the wireless node may advertise its MAC address and its area code to the wireless access point that connects the wireless node to the wireless network. The wireless access point receiving the identifying information then forwards the identifying information to an appropriate wireless network node (e.g., ACAS, location server, central controller, etc.) in the wireless network. In one implementation, the area code may be included in an Information Element appended to a wireless management message, such as an authentication request or an association request. Other implementations are possible.

In another implementation, whenever the wireless node connects to the wireless network, the wireless node may have a username associated with the connection to the wireless network (e.g., given by a user and authenticated by 802.1X). In one implementation, the X.509 certificate of the wireless node may include its home area code so that it may be communication when the X.509 certificate is used. In one implementation, the AAA server may provide the user area code to the wireless access point or central controller as part of providing the credentials for the user. The wireless access point may then forward the identifying information to an appropriate wireless network node (e.g., ACAS, location server, central controller, etc.) in the wireless network infrastructure. In one implementation, another wireless network infrastructure node such as a Windows Internet Naming Service (WINS) server may provide the area code to the wireless access point. In another implementation, a user may manually enter the area code.

In another implementation, whenever a wireless node connects to the wireless network, a wireless network node such as a Dynamic Host Configuration Protocol (DHCP) server may determine the area code by mapping the Internet Protocol (IP) Address of the wireless node to a specific area code and then provide the area code to the wireless access point, which may then forward the identifying information to an appropriate wireless network node (e.g., ACAS, location server, central controller, etc.) in the wireless network infrastructure. In one implementation, the user may also enter privacy options indicating who/when/where another user may be permitted to query where they are.

Referring again to FIG. 7, the ACAS 20a determines whether the connection event message is a remote connection event message (i.e., a connection event message transmitted from an ACAS in another area) (704). In one implementation, the connection event message can include a "remote" flag or other identifier that indicates that the connection event message is a remote connection event message. As discussed below, if a local ACAS receives a connection event message designating a wireless node assigned to a remote ACAS, it transmits a remote connection event message to the home ACAS of the wireless node. If the wireless connection event message is a remote message (704), the ACAS, in one implementation, stores the MAC address of the wireless node and an identifier of the remote ACAS contained in the message in the location services table.

In one implementation, the wireless network nodes that service the current connection may be referred to as local nodes. For example, in this scenario, ACAS 20*a* would be referred to as the local ACAS, and the area codes 407, 510, and 863 would be referred to as local area codes. Furthermore, the wireless network nodes associated with the wireless node may be considered home nodes. For example, in this scenario, the ACAS 20*b* would be the home ACAS. Similarly, the area code 415 would be referred to as the home area code, which would be remote, relative to ACAS 20*a*. In another example, a given ACAS (e.g., ACAS 20*b*) could be both the home ACAS and the local ACAS if wireless node 60*a* were to connect to the wireless network at a wireless network node at the 415 area code.

Referring again to FIG. 7, if the connection event message is not remote, the ACAS 20*a* adds the wireless node identifier to its location services table (708). In one implementation, the location services table 70*a* stores identifying information, which may include, for example, the MAC address of the wireless node and the area code of the wireless node, a flag indicating whether the wireless node is remote, the home ACAS of the wireless node, and the current ACAS to which the wireless node has registered, etc. In one implementation, the location server determines the actual location of the wireless node and stores the location in the location services table. While the location services table may store information such as the location of the wireless node, certain applications may desire other information directly from a location server. Such information may include, for example, historical tracking information, statistics, more detailed client information, etc. Accordingly, in one implementation, the location services table may also store the IP address (or other identifier) of the location server that last reported the wireless node 60*a* and the time that the location sever last reported it.

In the implementation illustrated in FIG. 7, ACAS 20*a* determines whether it is the home ACAS for the wireless node 60*a* identified in the connection event message (710). For example, ACAS 20*a* can compare the area code in the connection event message to the area code(s) that it services. If the identified area code matches the area code(s) serviced by ACAS 20*a*, the process ends. If the identified area code does not match, however, ACAS 20*a* transmits a remote connection event message event to home ACAS 20*b* of the wireless node 60*a* (712). In one implementation, ACAS 20*a* can identify the home ACAS by accessing a table or other data store that stores the area codes serviced by particular ACASs, including identifying information, such as IP addresses, and the like. The remote connection event message informs the home ACAS of the current ACAR in which the wireless node is connected. Home ACAS 20*b* may then store the identifying information from the connection event message in the location services table 70*b*, as discussed above.

D. Query of a Wireless Node

A user may query about a particular wireless node, where the user may enter the wireless node identity (username, IP address, MAC address, etc.). In one implementation, the user may optionally enter an area code for the wireless node. If an area code is not entered, the wireless network infrastructure may provide a mechanism (e.g., a WINS server, a AAA server, etc.) for mapping the wireless node to an area code. In one implementation, the ACAS may provide directory services. For example, a directory service may allow the user to select a wireless node from a list of all wireless nodes in a given area code. In one implementation, the directory services may enable a user obtain information (e.g., location) associated with the wireless node.

In one implementation, a query application may then send a unicast query to its local ACAS asking for the home ACAS that provides location services for the wireless node. As described in more detail below, the local ACAS responds with the home ACAS' contact details for the area code provided to the local ACAS as part of the query. If the area code was not provided to the local ACAS, the local ACAS may perform a WINS or AAA lookup to determine which ACAS serves the home ACAS.

Figure 8:
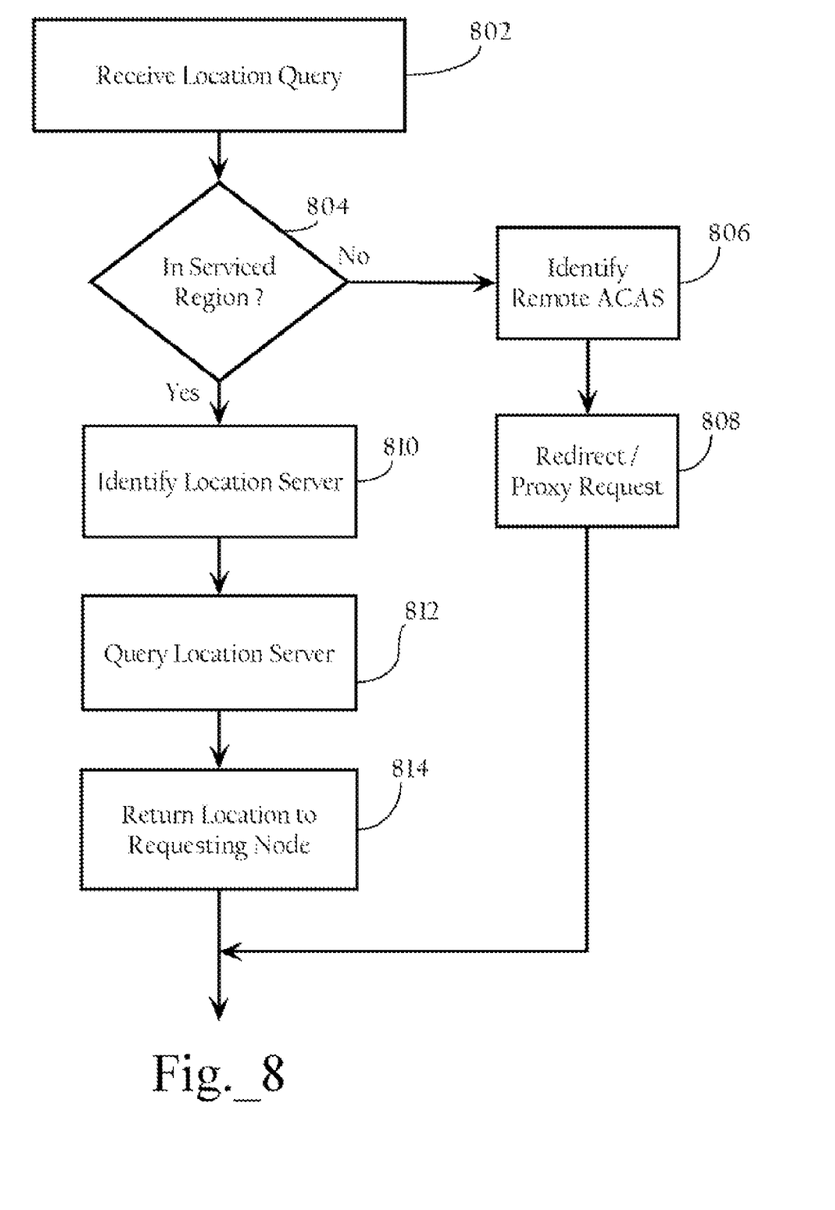
FIG. 8 illustrates another example method implemented at an ACAS.

As described in more detail below, any time a location server (e.g., location server 21*d*) is queried about a particular wireless node (e.g., wireless node 60*a*), the location server 21*d* may forward the location query to its associated ACAS 20*b*. As described above, if the wireless node 60*a* has roamed to an ACAR serviced by another ACAS 20*a*, that ACAS 20*a* would have sent the connection event message associated with the wireless node 60*a* to the home ACAS 20*b*. Accordingly, ACAS 20*b* would have the identifying information, which would include location information, and would thus be able to provide the location server 21*d* with the requested location information, as described more below.

FIG. 8 illustrates an example method implemented at an ACAS for processing location queries. As FIG. 8 shows, the ACAS (e.g., ACAS 20*b*) first receives a location query from a requesting node (e.g., a wireless node or an external system) (802), where the location query requests location information associated with a wireless node. In one implementation the location query may include a MAC address of the target wireless node. ACAS 20*b* then determines whether the identified wireless node is currently connected within the area(s) serviced by the home ACAS (804), which can be determined from its location services table 70*b*. If the wireless node is currently located within the region of the home ACAS, ACAS 20*b* identifies the primary location server that is assigned to the area code corresponding to the wireless node (810) and queries the location server for the location information (812). Otherwise, the ACAS identifies the current remote ACAS (806) corresponding to the area within which the wireless node is currently located, from the location services table, and, in one implementation, redirects the location query to the current remote ACAS (808). In another implementation, the ACAS can itself query the remote ACAS for the location information. ACAS 20*b* then returns the requested location to the requesting node (814).

The present invention has been explained with reference to specific embodiments. For example, while embodiments of the present invention have been described as operating in connection with IEEE 802.11 networks, the present invention can be used in connection with any suitable wireless network environment. Furthermore, while embodiments disclosed herein have been described in the context of wireless networks, embodiments may apply to wired networks, and still remain within the spirit and scope of the present invention. For example, the methods and systems described herein may apply to a laptop computer that is connected to a wired network at a remote office. Other embodiments will be evident to those of ordinary skill in the art. It is therefore not intended that the present invention be limited, except as indicated by the appended claims.

What is claimed is:

1. Logic encoded in one or more tangible media for execution and when executed operable to:
   receive a connection event message including information identifying a wireless node, wherein the identifying information comprises a wireless node identifier and an area code associated with the wireless node;

determine, based on the area code, whether the wireless node is connected to its home wireless network region;

add the identifying information to a location services table, wherein if the connection event message is flagged as being a remote connection event message, an identifier of a remote area code authority server is added to the location services table in association with the identifying information of the wireless node; and if the wireless node is not connected to its home network region, transmit a remote connection event message to a home area code authority server corresponding to the wireless node;

receive, at a home area code authority server for the wireless node, a location query from a requesting node, wherein the location query requests location information for the wireless node;

determine whether the wireless node is currently connected within at least one area serviced by the home area code authority server;

if the wireless node is currently connected within the at least one area, identify a location server that is assigned to the area code corresponding to the wireless node and query the location server for the location information;

return the requested location information for the wireless node received from the location server to the requesting node; and if the wireless node is currently connected outside the at least one area, identify a remote area code authority server corresponding to the area within which the wireless node is currently located and redirect the location query to the remote area code authority server.

2. The logic of claim 1 wherein the identifying information comprises at least one or more of an identifier of the wireless node, an area code of the wireless node, or a location of the wireless node.

3. The logic of claim 2 wherein the wireless node provides the area code.

4. The logic of claim 2 wherein an authentication server provides the area code.

5. The logic of claim 1 wherein, to determine whether the wireless node is remote, the logic is further operable to compare an area code of the wireless node to one or more local area codes.

6. The logic of claim 1 wherein the table comprises one or more of the media access control (MAC) addresses, the area code of the wireless node associated with the wireless node, a flag indicating whether the wireless node is remote, hardware serial number, Internet protocol address, one or more certificates, device identity, and user identity.

7. The logic of claim 1 wherein the logic is further operable to:
determine the location of the wireless node; and
store the location in the table.

8. A method comprising:
receiving a connection event message including information identifying a wireless node, wherein the identifying information comprises a wireless node identifier and an area code associated with the wireless node;
determining, based on the area code, whether the wireless node is connected to its home wireless network region;
adding the identifying information to a location services table, wherein if the connection event message is flagged as being a remote connection event message, an identifier of a remote area code authority server is added to the location services table in association with the identifying information of the wireless node; and
if the wireless node is not connected to its home wireless network region, transmitting a remote connection event message to a home area code authority server corresponding to the wireless node;
receiving, at a home area code authority server for the wireless node, a location query from a requesting node, wherein the location query requests location information for the wireless node;
determining whether the wireless node is currently connected within at least one area serviced by the home area code authority server;
if the wireless node is currently connected within the at least one area, identifying, by the home area code authority server for the wireless node, a location server that is assigned to the area code corresponding to the wireless node and querying the location server for the location information;
returning the requested location information for the wireless node received from the location server to the requesting node; and
if the wireless node is currently connected outside the at least one area, identifying, by the home area code authority server for the wireless node, a remote area code authority server corresponding to the area within which the wireless node is currently located and redirecting the location query to the remote area code authority server.

9. The method of claim 8 wherein the identifying information comprises at least one or more of an identifier of the wireless node, an area code of the wireless node, or a location of the wireless node.

10. The method of claim 9 wherein the wireless node provides the area code.

11. The method of claim 9 wherein an authentication server provides the area code.

12. The method of claim 8 further comprising comparing an area code of the wireless node to one or more local area codes.

13. The method of claim 8 wherein the table comprises one or more of the media access control (MAC) addresses, the area code of the wireless node associated with the wireless node, a flag indicating whether the wireless node is remote, hardware serial number, Internet protocol address, one or more certificates, device identity, or user identity.

14. The method of claim 8 further comprising:
determining the location of the wireless node; and
storing the location in the location services table.

15. A system comprising:
a wireless network infrastructure node operable to receive a connection event message including information identifying a wireless node, wherein the identifying information comprises a wireless node identifier and an area code associated with the wireless node;
determine, based on the area code, whether the wireless node is connected to its home wireless network region; add the identifying information to a location services table, wherein if the connection event message is flagged as being a remote connection event message, an identifier of a remote area code authority server is added to the location services table in association with the identifying information of the wireless node; and if the wireless node is not connected to its home network region, transmit a remote connection event message to a home area code authority server corresponding to the wireless node; receive a location query from a requesting node, wherein the location query requests location information for the wireless node; determine whether the wireless node is currently connected within at least one area serviced by a home area code authority server; if the wireless node is currently connected within the at least one area, identify a location server that is assigned to the area code corresponding to the wireless node, query the location server for the location information, and return the requested location information for the wireless node received from the location server to the requesting node; and if the wireless node is currently connected outside the at least one area, identify a remote area code authority server corresponding to the area within which the wireless node is currently located and redirect the location query to the remote area code server; and a wireless node operable to connect with the wireless network infrastructure node.

16. The system of claim 15 wherein the identifying information comprises at least one or more of an identifier of the wireless node, an area code of the wireless node, or a location of the wireless node.

17. The system of claim 15 wherein, to determine whether the wireless node is remote, the wireless network infrastructure node is further operable to compare an area code of the wireless node to one or more local area codes.

18. The system of claim 15 wherein the table comprises one or more of the media access control (MAC) addresses, the area code of the wireless node associated with the wireless node, a flag indicating whether the wireless node is remote, hardware serial number, Internet protocol address, one or more certificates, device identity, and user identity.

19. The system of claim 15 wherein the wireless network infrastructure node is further operable to:
determine the location of the wireless node; and
store the location in the location services table.

20. Logic encoded in one or more tangible media for execution and when executed operable to:
receive, at a home area code authority server for a wireless node, a location query from a requesting node, wherein the location query requests location information for the wireless node;
determine whether the wireless node is currently connected within at least one area serviced by the home area code authority server;
if the wireless node is currently connected within the at least one area, identify a location server that is assigned to the area code corresponding to the wireless node, and query the location server for the location information;
return the requested location information for the wireless node received from the location server to the requesting node; and
if the wireless node is currently connected outside the at least one area, identify a remote area code authority server corresponding to the area within which the wireless node is currently located and redirect the location query to the remote area code server.

21. The logic of claim 20 wherein, to return the requested location to the requesting node, the logic is further operable to retrieve the location information from a table.

22. The logic of claim 20 wherein the location query may include a media access control (MAC) address of the wireless node.

23. The logic of claim 20 wherein the logic is further operable to provide directory services that enable a user obtain information associated with the wireless node.

24. A method comprising:
receiving a location query from a requesting node, wherein the location query requests location information for the wireless node;
determining whether the wireless node is currently connected within at least one area serviced by a home area code server;
if the wireless node is currently connected within the at least one area, identifying a location server that is assigned to the area code corresponding to the wireless node, and querying the location server for the location information;
returning the requested location information for the wireless node received from the location server to the requesting node; and
if the wireless node is currently connected outside the at least one area, identifying a remote area code server corresponding to the area within which the wireless node is currently located and redirecting the location query to the remote area code authority server.

25. The method of claim 24 further comprising retrieving the location information from a table.

26. The method of claim 24 wherein the location query may include a media access control (MAC) address of the wireless node.

27. The method of claim 24 further comprising providing directory services that enable a user obtain information associated with the wireless node.

* * * * *